United States Patent
Teng et al.

[11] Patent Number: 5,774,303
[45] Date of Patent: Jun. 30, 1998

[54] SPUTTER INDUCED MICRO-TEXTURING ENHANCEMENT FOR MAGNETIC HEAD STRUCTURES

[75] Inventors: Edward F. Teng, Sunnyvale; Kent Kaufman, Los Gatos; Atef H. Eltoukhy, Saratoga; Phuong Nguyen, Milpitas, all of Calif.

[73] Assignee: StorMedia, Inc., Santa Clara, Calif.

[21] Appl. No.: 409,698

[22] Filed: Mar. 24, 1995

[51] Int. Cl.⁶ ............................. G11B 5/60; G11B 21/21
[52] U.S. Cl. .................................................. 360/103
[58] Field of Search .................................. 360/102, 103, 360/135; 204/192.1, 192.15, 192.16

[56] References Cited

U.S. PATENT DOCUMENTS

| | | | |
|---|---|---|---|
| 3,919,717 | 11/1975 | Cullen et al. | 360/122 |
| 4,327,387 | 4/1982 | Plotto | 360/103 |
| 5,010,429 | 4/1991 | Taguchi et al. | 360/103 |
| 5,052,099 | 10/1991 | Taguchi et al. | 360/122 |
| 5,079,657 | 1/1992 | Aronoff et al. | 360/103 |
| 5,080,948 | 1/1992 | Morita et al. | 428/64 |
| 5,083,365 | 1/1992 | Matsumoto | 360/122 |
| 5,175,658 | 12/1992 | Chang et al. | 360/103 |
| 5,198,934 | 3/1993 | Kubo et al. | 360/103 |
| 5,323,282 | 6/1994 | Kanai et al. | 360/103 |
| 5,386,400 | 1/1995 | Nakayama et al. | 360/103 |
| 5,470,447 | 11/1995 | Mahvan et al. | 204/192.16 |
| 5,482,785 | 1/1996 | Mahvan et al. | 428/611 |
| 5,553,037 | 9/1996 | Tachibana | 360/103 |
| 5,620,574 | 4/1997 | Teng et al. | 204/192.15 |

FOREIGN PATENT DOCUMENTS

| | | | |
|---|---|---|---|
| 60-205879 | 10/1985 | Japan | 360/103 |

*Primary Examiner*—Stuart S. Levy
*Assistant Examiner*—David L. Ometz
*Attorney, Agent, or Firm*—Lahive & Cockfield, LLP

[57] ABSTRACT

An enhanced magnetic head is characterized by sputter induced, micro-texturing yielding rounded globular configurations on slider rail portions. Optimally, this enhanced head is employed in combination with sputter induced microtextured thin film disk media having a surface or coarseness greater than that of the magnetic head.

3 Claims, 4 Drawing Sheets

SPUTTER INDUCED MICRO-TEXTURING ENHANCEMENT FOR MAGNETIC HEAD STRUCTURES

BACKGROUND OF THE INVENTION

This invention pertains to an enhanced magnetic head incorporated in a thin film magnetic disk drive. Specifically, the invention relates to the sputter micro-texturing of slider rail portions of such a magnetic head so as to provide a uniquely enhanced degree of surface roughness on the slider rails. This minimizes the likelihood of the development of so-called stiction problems. Ideally, the invention will be practiced in combination with sputter-induced, micro-textured (i.e., SIMT) thin film magnetic disk media.

This invention contemplates utilization of sputter induced micro-texturing (i.e., SIMT) techniques and materials generally described in Applicant's, prior, co-pending applications as follows:

| TITLE | INVENTORS | SER. NO. | FILING DATE |
| --- | --- | --- | --- |
| Enhanced Methods And Apparatus For Producing Micro-Textured, Thin Film, Magnetic Disc Media And Compositely Micro-Textured Disc Media Produced Thereby | Teng, Eltoukhy, Clark, Goh | 08/275,969 | July 15, 1994 |
| Sputter Induced, Micro-Texturing Of Thin Film, Magnetic Disc Media | Teng, Nguyen | 08/296,958 | August 26, 1994 |

DESCRIPTION OF THE PRIOR ART

In the prior art there is some recognition of the desirability of roughening or texturing the slider rails of magnetic media head.

For example, two Hitachi patents, i.e., Taguchi et al U.S. Pat. Nos. 5,010,429 and 5,052,099 constitute related cases, each of which discloses sputter etching of ceramic slider surfaces to provide desired surface roughness in order to reduce stiction problems.

In placing reliance on etching, these prior art teachings fail to suggest the utilization of the SIMT approach to appropriately condition magnetic head structures, i.e., slider surfaces, etc.

Additionally, a TDK patent, i.e., Morita et al U.S. Pat. No. 5,080,948 which deals generally with the maintenance of a desired range of surface roughness on a disk so as to obtain a desired floating head height, discloses a head roughness of up to 200 Å, preferably in the 50–150 Å range (see col. 8 at lines 52–57) and vaguely references the use of etching (col. 9 at line 55). This patent recommends use of the Rmax roughness of up to 200 Å in conjunction with a disk having:

a glass substrate, the major surface of which has a surface roughness Rmax in the range of 10 to 80 Å, and a magnetic medium on the surface which has a surface roughness Rmax in the range of 50 to 150Å.

It may also be noted that a Matsumoto U.S. Pat. No. 5,083,365 discloses head etching and polishing and a Cullen et al U.S. Pat. No. 3,919,717 discloses the embedment of particulate material on a head surface for wear resistant properties. Neither of these patents appears to us to be relevant to the concept under consideration but are generally indicative of work which has been done with respect to modifications of magnetic head surfaces.

All in all, the prior art noted above fails to disclose or suggest SIMT modified magnetic head structures.

SUMMARY OF THE INVENTION

This invention involves independent aspects pertaining to 1) enhanced head configurations, 2) methods of providing such, and 3) an overall apparatus including the enhanced head of this invention employed in conjunction with sputter induced micro-textured, thin film magnetic media in a disk drive.

From the standpoint of the head structure, the invention basically contemplates a head configuration for use in reading/writing magnetic media, which magnetic head includes media data sensing means, and slider rail means engagingly facing the magnetic media surface means.

The basic improvement in this head configuration afforded by this invention comprises:

A. solidified, sputter deposited, mutually spaced, globular configurations supported by supporting portions of the slider rail means and operable to face the magnetic media;

B. the slider rail means supported globular configurations being
1. generally uniform in height, as measured generally normal to the slider rail means supporting portions,
2. generally uniform in dispersion array as measured generally parallel to the slider rail means supporting portions,
3. comprising at least one of
   a. a eutectic alloy, or
   b. a peritectic alloy, and
4. being substantially free of angular extremities;

C. the media data sensing means having been shielded from sputter deposition of said globular configurations during the sputter deposition thereof on the slider rail means;

D. the globular configurations substantially preventing the angular surface engagement between the magnetic head and the magnetic media; and E. the globular configurations being operable to insure generally uniform engagement between the slider rail means and the magnetic media.

Independently significant aspects of the invention reside in head refinements as follows:

First, a basic magnetic head as above described is contemplated, further comprising:

an insulating layer interposed between the supporting portions of the slider rail means and the globular configurations, the insulating layer being generally non-wettable by the material of the globular configurations during the sputter deposition thereof.

Second, a basic magnetic head as described above is presented wherein:

the globular configurations comprise a eutectic alloy material, and the eutectic alloy comprises about 65% by weight Indium and about 35% by weight Bismuth.

Particular advantages are believed to be derived from utilizing the foregoing refinements in combination.

A further, independently significantly aspect of the invention resides in a method of fabricating the enhanced magnetic head of the present invention, this method involving steps comprising:

providing solidified, sputter deposited, mutually spaced, globular configurations supported by supporting portions of the slider rail means and operable to face the magnetic media;

the slider rail means supported globular configurations being generally uniform in height, as measured generally normal to the slider rail means supporting portions, generally uniform in dispersion array as measured generally parallel to the slider rail means supporting portions, comprising at least one of
a eutectic alloy, or
a peritectic alloy, and being substantially free of angular extremities;

shielding the media data sensing means from sputter deposition of the media data sensing means from sputter deposition of globular configurations during the sputter deposition thereof on the slider rail means;

the presence of the globular configurations substantially preventing angular surface engagement between the magnetic head and the magnetic media; and the presence of globular configurations being operable to insure generally uniform engagement between the slider rail means and the magnetic media.

Further method refinements of the invention are characterized by the following aspects:

A first refinement aspect of the basic method, described above, entails:

providing by sputter deposition, an insulating layer interposed between the supporting portions of the slider rail means and the globular configurations, this insulating layer being generally non-wettable by the material of the globular configurations during the sputter deposition thereof.

A second; method enhancement useful in implementing the basic method, with or without the first enhancement, involves:

the globular configurations being formed by sputter depositing a eutectic alloy material, with the eutectic alloy comprising about 65% by weight Indium and about 35% by weight Bismuth.

In an apparatus sense, the invention is characterized by an improvement upon the combination of a data disk apparatus including 1) thin film magnetic media and 2) a magnetic head for reading/writing the magnetic media. This magnetic head would include media data sensing means, and slider rails means engagingly facing magnetic media surface means.

The improvement in the apparatus combination presented through this invention is characterized by:

solidified, sputter deposited, mutually spaced, micro-texturing globular configurations supported by supporting portions of the slider rail means and operable to face the magnetic media and provide sputter induced micro-texturing on the slider rail means;

the slider rail means supported globular configurations being generally uniform in height, as measured generally normal to the slider rail means supporting portions, generally uniform in dispersion array as measured generally parallel to the slider rail means supporting portions, comprising at least one of
a eutectic alloy, or
a peritectic alloy, and being substantially free of angular extremities;

the media data sensing means having been shielded from sputter deposition of the globular configurations during the sputter deposition thereof on the slider rail means;

the globular configurations substantially preventing angular surface engagement between the magnetic head and the magnetic media;

the globular configurations being operable to insure generally uniform engagement between the slider rail means and the magnetic media; and sputter induced micro-texturing formed on the thin film magnetic media and operable to face the sputter induced micro-texturing on the slider rail means.

Ideally, and in an optimized format, the apparatus concept would further entail:

an insulating layer interposed between the supporting portions of the slider rail means and the globular configurations, the insulating layer being generally non-wettable by the material of the globular configurations during the sputter deposition thereof; and the magnetic head being characterized by the globular configurations comprising a eutectic alloy material, this eutectic alloy comprising about 65% by weight Indium and about 35% by weight Bismuth; and the sputter induced micro-texturing on the slider rail means having a roughness substantially less than that of the sputter induced micro-texturing formed on the thin film magnetic media.

Having summarized the overall invention, it is now appropriate to consider aspects of the presently preferred embodiments thereof, as depicted in the appended drawings.

DRAWINGS

In the drawings:

FIG. 1 provides a fragmentary, overall view of a head and thin film disk assembly, illustrating the relative positioning of the read/write magnetic head and the thin film magnetic disk containing data and the SIMT arrays formed on each of the head and disk;

FIG. 2 provides a graphic depiction of the stable, reduction in stiction properties afforded through this invention;

FIGS. 3 and 4 provide enlarged (1,000 magnification) views, respectively, of an uncoated head slider lacking SIMT texturing and a head slider coated with tantalum oxide and carbon but lacking SIMT texturing; and FIGS. 3a and 4a provide further enlarged views (100,000 magnification) of the head structures of FIGS. 3 and 4, respectively, more clearly depicting the absence of the desired, rounded, head rail texturing afforded through the present invention; and FIGS. 5 and 6 provide enlarged views (1,000 magnification and 100,000 magnification, respectively) showing the SIMT textured, head slider rail means of this invention.

DESCRIPTION OF THE PREFERRED EMBODIMENTS

Figure 1:
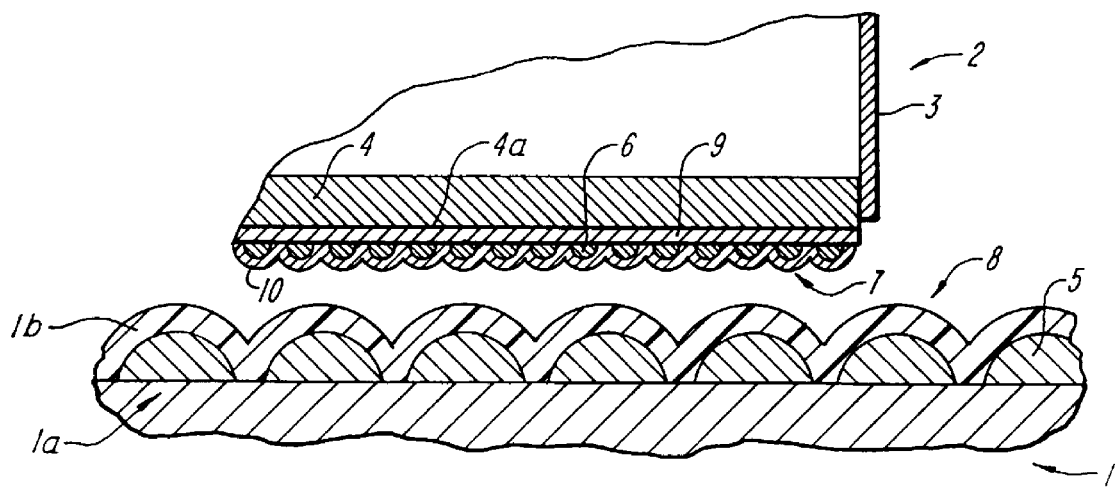

In describing presently preferred embodiments of the invention, reference will be made to an overview of the invention, in the context of the overall disk drive assembly. This overview inherently presents the enhanced head and method aspects of the invention.

Following the overview, a summary of sputter induced micro-texturing, utilizing one of peritectic and eutectic alloys, will be reviewed, keeping in mind that this disclosure incorporates by reference the co-pending applications of Applicant noted at the outset of this specification which describe such SIMT techniques in greater detail.

Overview

With respect to the overall disk drive assembly, it is characterized by the following combination concept.

This apparatus combination includes a) a thin film magnetic media 1 and b) a magnetic head 2 for reading/writing the magnetic media and which includes media data sensing means 3 and slider rail means 4 engagingly facing the magnetic media surface means 5.

The improvement in this apparatus resides in solidified, sputter deposited, mutually spaced, micro-texturing globular configurations 6 supported by supporting portions 4a of the slider rail means 4 and operable to face the magnetic media and provide sputter induced micro-texturing 7 on the slider rail means 4. The slider rail means 4 supported globular configurations 6 are generally uniform in height, as measured generally normal to said slider rail means supporting portions, and are generally uniform in dispersion array as measured generally parallel to said slider rail means supporting portions. The globular configurations will comprise at least one of a eutectic alloy, or a peritectic alloy, and be substantially free of angular extremities.

The media data sensing means 3 will have been shielded from sputter deposition of the globular configurations 6 during the sputter deposition thereof on the slider rail means 4.

The globular configurations serve to substantially prevent angular surface engagement between the magnetic head and the magnetic media. Further, these globular configurations, in being generally uniform in height and dispersion, are operable to insure generally uniform engagement between the slider rail means 4 and the magnetic media 1.

Any, desirably provided, sputter induced micro-texturing 8 formed on the thin film magnetic media will be operable to face the sputter induced micro-texturing 7 formed on the slider rail means 4.

Micro-texturing 7 refers to the outwardly manifested, textured exterior of the slider rail means, reflecting the initially applied, sputtered globules 6. As will be hereinafter noted, globules 6 are preferably deposited on an insulating layer 9 which is sputter deposited on slider rail surface means 4a. Thereafter, a carbon overcoat 10 may be sputter deposited over the SIMT globules 6, as generally shown in FIG. 1.

Similarly, disk micro-texturing 8 comprises the textured exterior surface of the disk 1. As is described in the prior applications of Applicants', Ser. No. 275,969 and Ser. No. 296,958 described in the "General Background Of Invention", this external texturing 8 results from the sputter deposition of micro-globules 5 onto the disk substrate 1a, after which a composite media layer means and protective coating, together labeled 1b, are sequentially sputter deposited.

In the more refined and optimized mode alluded to above, the basic apparatus invention is further characterized by the insulating layer 9 being interposed between the supporting portions 4a of the slider rail means 4 and the globular configurations 6. This insulating layer, preferably a Tantalum Oxide ($Ta_2O_5$), will be generally non-wettable by the material of the globular configurations during the sputter deposition thereof. A carbon overcoat 10 may be sputter deposited over the SIMT globules and essentially retain the SIMT texturing defined by globules 6.

As presently contemplated, the magnetic head will be characterized by the globular configurations comprising a eutectic alloy material. This eutectic alloy desirably will comprise about 65% by weight Indium and about 35% by weight Bismuth.

It is further contemplated that the sputter induced micro-texturing on the slider rail means may have a roughness substantially less than that of the sputter induced micro-texturing formed on the thin film magnetic media.

Detailed Parameters Of Invention

Techniques for sputter depositing rounded globules of eutectic alloys are described in detail in the prior, co-pending Teng et al applications noted at the outset of this disclosure. The sputter deposition of peritectic alloy materials to produce micro-texturing, rounded globules is described in the pending application of Mahvan et al, Ser. No. 959,986, filed Oct. 13, 1992, and assigned to the assignee of the present application.

With respect to detailed aspects of possible representative implementation of the sputter induced micro-texturing of this invention, the disclosures of the aforesaid Teng et al pending applications and Mahvan et al pending application are herein incorporated by reference.

As presently contemplated, the eutectically alloyed Indium/Bismuth globules as featured in the above noted Teng et al applications or the Tin/Silver peritectically alloyed globules of the above noted Mahvan et al application will be sputter deposited to a level of about 80 or 90 angstroms (i.e., 90 angstroms would be the height of sputtered, eutectic alloy accumulation on a non-absorbing surface such as glass). The average lateral dispersion of this sputtered array will entail an average, peak-to-peak spacing of such globules on the order of about 100 to 200 angstroms or less. Even with a subsequently, sputter deposited carbon overcoat layer sputter deposited over the SIMT globules, the texturing of globules will be substantially transmitted to the outer disk surface, thereby providing effective surface roughness or texturing on the slider rails. This head texturing will thus face the SIMT implemented texturing on the outer surface of the media disk and minimize or, reduce the occurrence of, stiction problems. In this respect, it is believed that a finer SIMT texturing on the head, relative to the disk SIMT texturing, further lessens the significance or occurrence of stiction incidents. As an example of the greater degree of coarseness of disk texturing, reference may be made to the disclosure of the aforesaid Teng et al application Ser. No. 275,969. This Teng et al application notes sputtered globule height levels of about 300 to 500 angstroms with a lateral, peak-to-peak spacing of about 800 to 1200 angstroms.

In addition, it is contemplated that the Tantalum Oxide layer 9 will be sputter deposited on rail surface means 4a to a level of about 20 angstroms and the carbon overcoat 10 will be sputter deposited to a level of about 30 angstroms.

With respect to the insulating layer upon which the SIMT globules are sputter deposited and the subsequent carbon overcoating of the head deposited SIMT globules, the parameters for such coatings are generally described in Applicants' prior application Ser. No. 315,092, filed Sep. 29, 1994 which is a continuation of application Ser. No. 932, 335, filed Aug. 19, 1992. The inventors for this application are Mahvan, Eltoukhy and Teng and the title for this application is Method For Applying A Coating On A Magnetic Recording Head And Coated Head Produced Thereby. The disclosure of application Ser. No. 315,092 is hereby incorporated by reference.

Overview of Advantages

Figure 2:
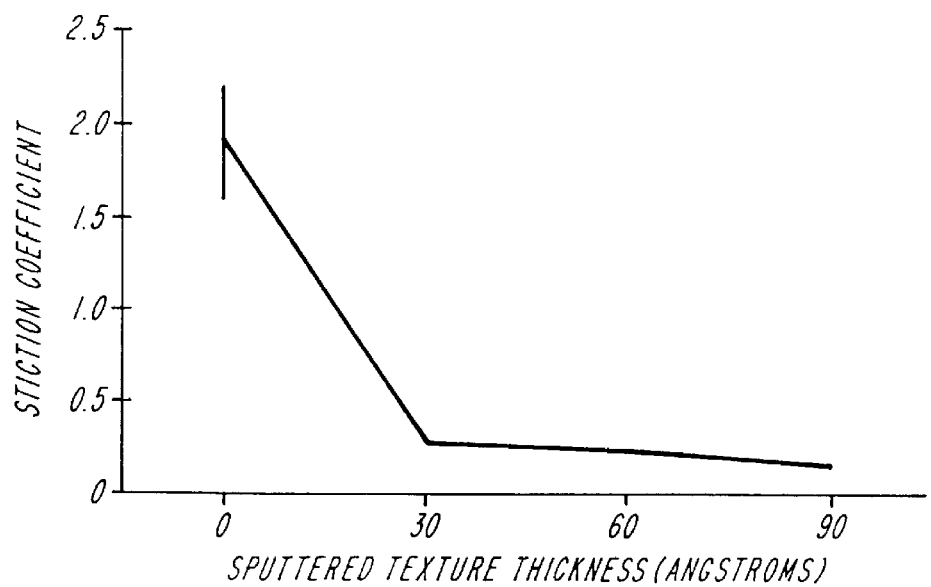

FIG. 2 dramatically illustrates the extent to which the SIMT head case texturing of the present invention reduces and stabilizes stiction coefficient characteristics.

As is shown in FIG. 2, sputter depositions of SIMT globules or the globule deposition heights (i.e., sputter level on non-permeable surface) ranging from about 30 to 90 angstroms depicts a substantial reduction and leveling of stiction characteristics at an extremely low level, i.e., at a level on the order of about 0.3 and less.

It is believed that this significant reduction may be a direct consequence of the smooth globular nature of the texturing deposited on the head through the present invention.

Figure 3:
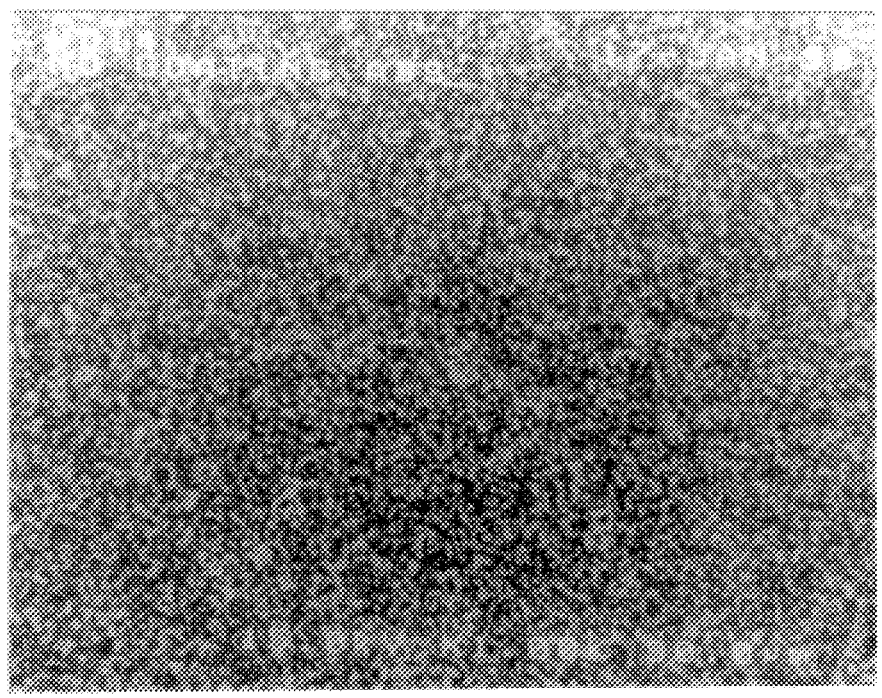
Figure 4:
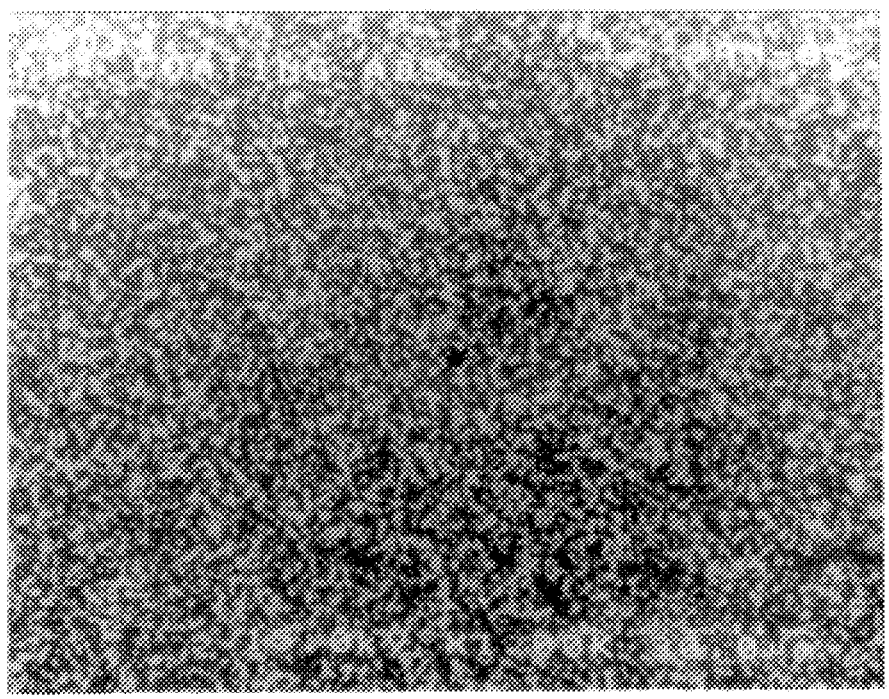
Figure 3A:
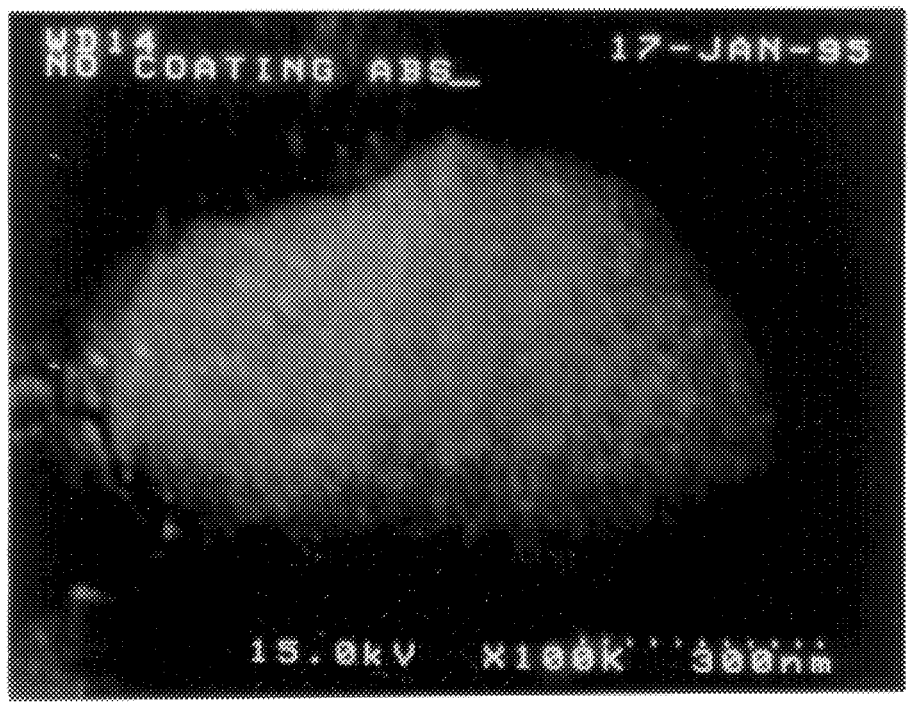
Figure 4A:
Figure 5:
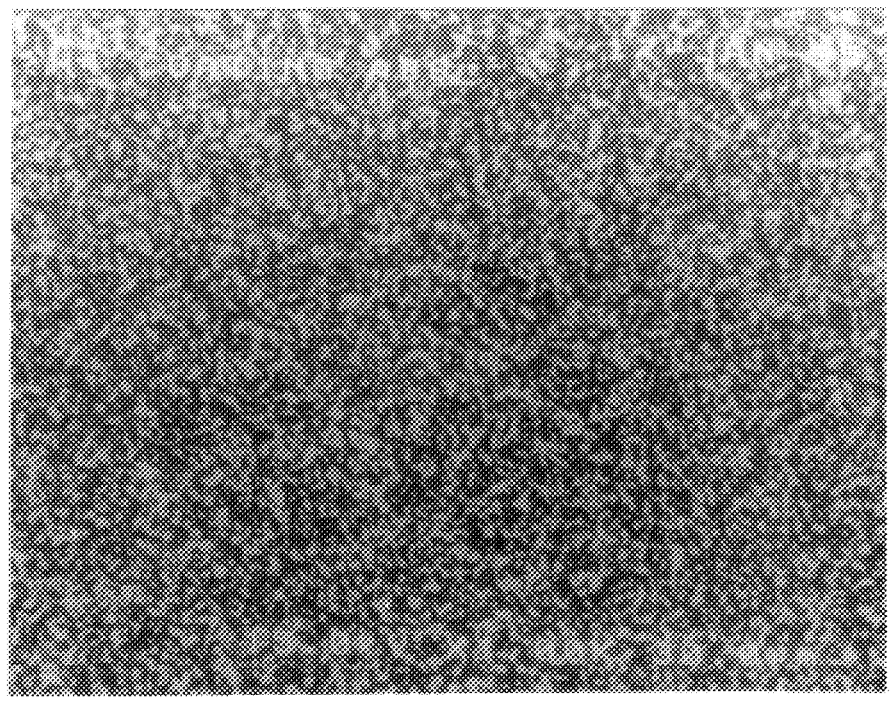
Figure 6:
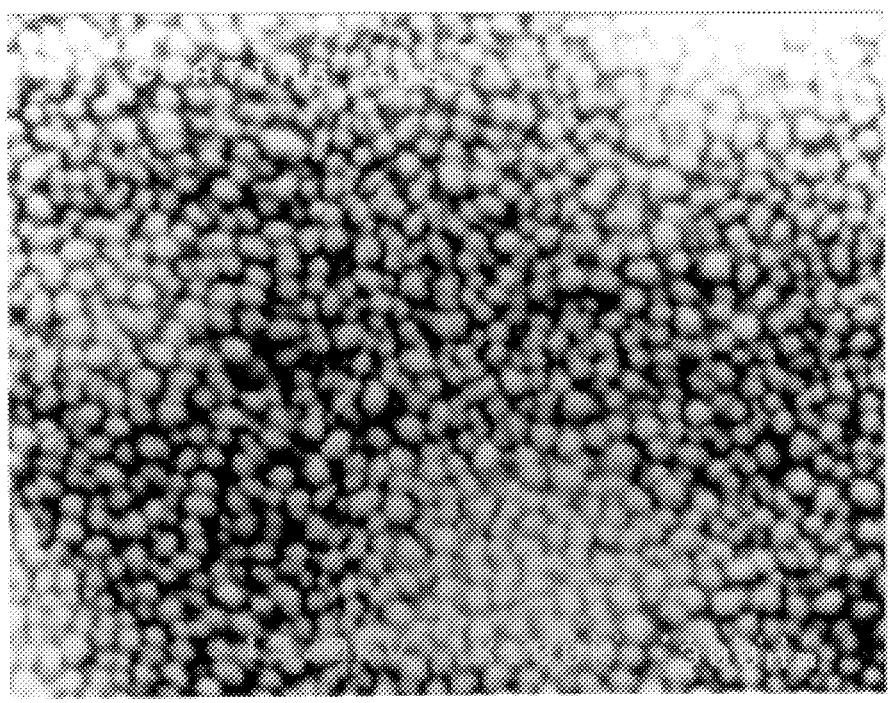

For example, turning to FIGS. 3 and 4 it will be noted that the photomicrographs there shown clearly illustrate a relatively angular characteristic for the head slider rail portions engagable with media disks. As has been heretofore noted, FIG. 3 depicts a surface at a 1,000 magnification for a head lacking any coating while FIG. 4, at the same magnification, depicts a head provided with a coating of 15 angstroms of tantalum oxide ($Ta_2O_5$) and an overcoat of carbon sputter deposited at a level of 25 angstroms. This latter configuration is substantially in conformance with the disclosure of Applicants' prior application Ser. No. 315,092, above noted.

In contrast to the angular configurations depicted in FIGS. 3 and 4, FIGS. 5 and 6 clearly illustrate, at different magnifications, the essentially non-angular and rounded texturing configuration resulting from the SIMT head texturing technique of the present invention.

It is believed that the rounded globule characteristics of the SIMI induced head texturing, possibly in conjunction with the relatively coarser SIMT texturing on the associated disk media may provide an effectively interacting system promoting stiction reduction.

Moreover, it is believed that the globular, rounded texturing produced by the SIMT technique on each of the head and disk may well contribute to an enhanced air flow arrangement between the disk and the media, contributing to a more stable head flying characteristic.

Summary of Preferred Embodiments In Context Of Produced Product

With the invention having been described in detail in the context of the magnetic head and disk drive assembly, it is appropriate at this juncture to summarize the invention in relation to the basic method steps employed in the manufacture of the enhanced magnetic head assembly of this invention.

Basically, the magnetic head enhancing method of the invention resides in the following steps, such not being set forth not in a mandatory sequence of implementation. These steps comprise:

providing solidified, sputter deposited, mutually spaced, globular configurations 6 supported by supporting portions 4a of said slider rail means 4 and operable to face the magnetic media 1;

these slider rail means supported, globular configurations 6 being generally uniform in height, as measured generally normal to the slider rail means supporting portions 4a, generally uniform in dispersion array as measured generally parallel to the slider rail means supporting portions 4a, comprising at least one of a eutectic alloy, or a peritectic alloy, and being substantially free of angular extremities.

The media data sensing means 3 of head assembly 2 is shielded from sputter deposition of globular configurations during the sputter deposition thereof on the slider rail means 4. The presence of the globular configurations 6 substantially prevents angular surface engagement between the magnetic head 2 and the magnetic media 1. Further, the presence of the globular configurations 6 is operable to insure generally uniform engagement between the slider rail means 4 and the magnetic media 1.

SUMMARY OF MAJOR ADVANTAGES, NON-OBVIOUSNESS AND OVERALL SCOPE OF INVENTION

The present invention provides a unique technique for enhancing the surface engagement characteristics of a magnetic head without engendering the forming of relatively more vulnerable, sharp cornered configurations as could result from the prior art etching techniques.

The rounded globular configurations of the present invention are believed to provide a uniquely effective surface roughness enhancement which minimizes the propensity for catastrophic collision between the head and the disk drive which could result from the presence of jagged, abutting interfaces.

By providing different degrees of roughness on the head and the magnetic disk, with the head having the lesser degree of roughness, the likelihood of disruptive engagement between the head and disk is further minimized.

Moreover, the rounded globule SIMT texturing of the head, and desirably also the disk, may well contribute to an improved air flow between the head and the disk, assisting in more stable head flying characteristics.

As will be appreciated, the presentation of the invention at the outset of the specification, in relation to known prior art, inherently evidences the distinguishing characteristics of the present invention which set it apart from the prior art and demonstrate its non-obviousness.

Those skilled in the magnetic media head manufacturing art and familiar with this disclosure may well recognize additions, deletions, substitutions, and other modifications all of which would be deemed to fall within the purview of the appended claims.

What is claimed is:

1. In a magnetic head for reading/writing magnetic media and which includes media data sensing means, and slider rail means engagingly facing magnetic media surface means; the improvement comprising:

solidified, sputter deposited, mutually spaced, globular configurations supported by supporting portions of said slider rail means and operable to face said magnetic media;

said slider rail means supported globular configurations being generally uniform in height, as measured generally normal to said slider rail means supporting portions;

generally uniform in dispersion array as measured generally parallel to said slider rail means supporting portions, comprising
a eutectic alloy substantially free of angular extremities;
said media data sensing means having been shielded from sputter deposition of said globular configurations during the sputter deposition thereof on said slider rail means;
said globular configurations substantially preventing angular surface engagement between said magnetic head and said magnetic media;
said globular configurations being operable to insure generally uniform engagement between said slider rail means and said magnetic media; and
said globular configurations comprise said eutectic alloy material, with
said eutectic alloy comprising about 65% by weight Indium and about 35% by weight Bismuth.

2. A magnetic head as described in claim 1 further comprising:
an insulating layer interposed between said supporting portions of said slider rail means and said globular configurations,
said insulating layer being generally non-wettable by the material of said globular configurations during the sputter deposition thereof.

3. In a magnetic data disk apparatus including 1) a thin film magnetic media and 2) a magnetic head for reading/writing on said magnetic media and which includes
media data sensing means, and
slider rail means engagingly facing magnetic media surface means;
the improvement in said apparatus comprising:
solidified, sputter deposited, mutually spaced, micro-texturing globular configurations supported by supporting portions of said slider rail means and operable to face said magnetic media so as to provide sputter induced micro-texturing on said slider rail means;
said slider rail means supported globular configurations being
generally uniform in height, as measured generally normal to said slider rail means supporting portions,
generally uniform in dispersion array as measured generally parallel to said slider rail means supporting portions,
comprising
a eutectic alloy substantially free of angular extremities;
said media data sensing means having been shielded from sputter deposition of said globular configurations during the sputter deposition thereof on said slider rail means;
said globular configurations substantially preventing angular surface engagement between said magnetic head and said magnetic media;
said globular configurations being operable to insure generally uniform engagement between said slider rail means and said magnetic media;
sputter induced micro-texturing formed on said thin film magnetic media and operable to face said sputter induced micro-texturing on said slider rail means; and
an insulating layer interposed between said supporting portions of said slider rail means and said globular configurations,
said insulating layer being generally non-wettable by the material of said globular configurations during the sputter deposition thereof; and
said magnetic head being characterized by
said globular configurations comprising said eutectic alloy material,
said eutectic alloy comprising about 65% by weight Indium and about 35% by weight Bismuth; and
said sputter induced micro-texturing on said slider rail means having a roughness
substantially less than that of said sputter induced micro-texturing formed on said thin film magnetic media.

* * * * *